(12) United States Patent
Mori (10) Patent No.: US 9,121,991 B2
(45) Date of Patent: Sep. 1, 2015

(54) SURFACE LIGHT SOURCE DEVICE

(71) Applicant: OMRON Corporation, Kyoto (JP)

(72) Inventor: Masanori Mori, Sakado (JP)

(73) Assignee: OMRON Corporation, Kyoto (JP)

( * ) Notice: Subject to any disclaimer, the term of this patent is extended or adjusted under 35 U.S.C. 154(b) by 109 days.

(21) Appl. No.: 13/773,050

(22) Filed: Feb. 21, 2013

(65) Prior Publication Data

US 2013/0242609 A1    Sep. 19, 2013

(30) Foreign Application Priority Data

Mar. 15, 2012  (JP) ................................. 2012-058533

(51) Int. Cl.
*F21V 8/00* (2006.01)
(52) U.S. Cl.
CPC .................................. *G02B 6/0088* (2013.01)
(58) Field of Classification Search
CPC ... H01L 24/97; H01L 33/52; H01L 2933/005; H01L 31/0232; H01L 31/02327; H01L 33/54; G02F 1/133308; G02F 2202/28; G02F 1/133608; G02B 6/0088
USPC .............. 342/58, 60–65, 122; 362/97.1–97.4, 362/600–634, 217.02–217.17
See application file for complete search history.

(56) References Cited

U.S. PATENT DOCUMENTS 5,335,100 A * 8/1994 Obata .............................. 349/65
5,835,179 A * 11/1998 Yamanaka ..................... 349/161
5,889,568 A * 3/1999 Seraphim et al. ............... 349/73
6,124,917 A * 9/2000 Fujioka et al. ................. 349/153
6,552,761 B1 * 4/2003 Seo et al. .......................... 349/58
7,154,571 B2 * 12/2006 Fukayama et al. .............. 349/58
7,283,185 B2 * 10/2007 Hirakata et al. ................. 349/58
7,932,967 B2 * 4/2011 Kanaya et al. ................... 349/64
8,471,975 B2 * 6/2013 Lee .................................. 349/58
2002/0163615 A1 * 11/2002 Fujioka et al. ................. 349/154
2007/0109461 A1 * 5/2007 Park .................................. 349/58
2008/0180597 A1 * 7/2008 Tsai et al. ........................ 349/64

(Continued)

FOREIGN PATENT DOCUMENTS

| CN | 101583900 A | 11/2009 |
|---|---|---|
| CN | 102057209 A | 5/2011 |
| JP | 93033510 | * 1/1989 |

(Continued)

OTHER PUBLICATIONS

Chinese Office Action for Application No. 201310063326.4, issued Dec. 2, 2014 (10 pages).

*Primary Examiner* — Anh Mai
*Assistant Examiner* — Fatima Farokhrooz
(74) *Attorney, Agent, or Firm* — Nutter McClennen & Fish LLP; John J. Penny, Jr.

(57) ABSTRACT

A surface light source device in which an optical sheet and light guide plate can be firmly fixed at low cost. The surface light source device has a light source, a frame that includes an accommodation part and at least a part of the accommodation part is surrounded by a sidewall, a light guide plate accommodated in the accommodation part, at least one optical sheet stacked on the light guide plate. A part of the light guide plate and a part of the optical sheet are fixed to the frame by filling a gap between a part of an outer surface of the light guide plate and an inner surface of the sidewall with an adhesive resin.

6 Claims, 13 Drawing Sheets

(56) References Cited

U.S. PATENT DOCUMENTS

2010/0066938 A1* 3/2010 Lee ................................ 349/58
2010/0171900 A1* 7/2010 Lee ................................ 349/58

FOREIGN PATENT DOCUMENTS

JP        2003-207767 A      7/2003
JP        2009139589    *    6/2009

* cited by examiner

SURFACE LIGHT SOURCE DEVICE

TECHNICAL FIELD

The present invention relates to a surface light source device, and specifically to a surface light source device that is used as a backlight of a liquid crystal display incorporated in in-vehicle instruments or mobile electronic terminals.

BACKGROUND ART

Figure 1:
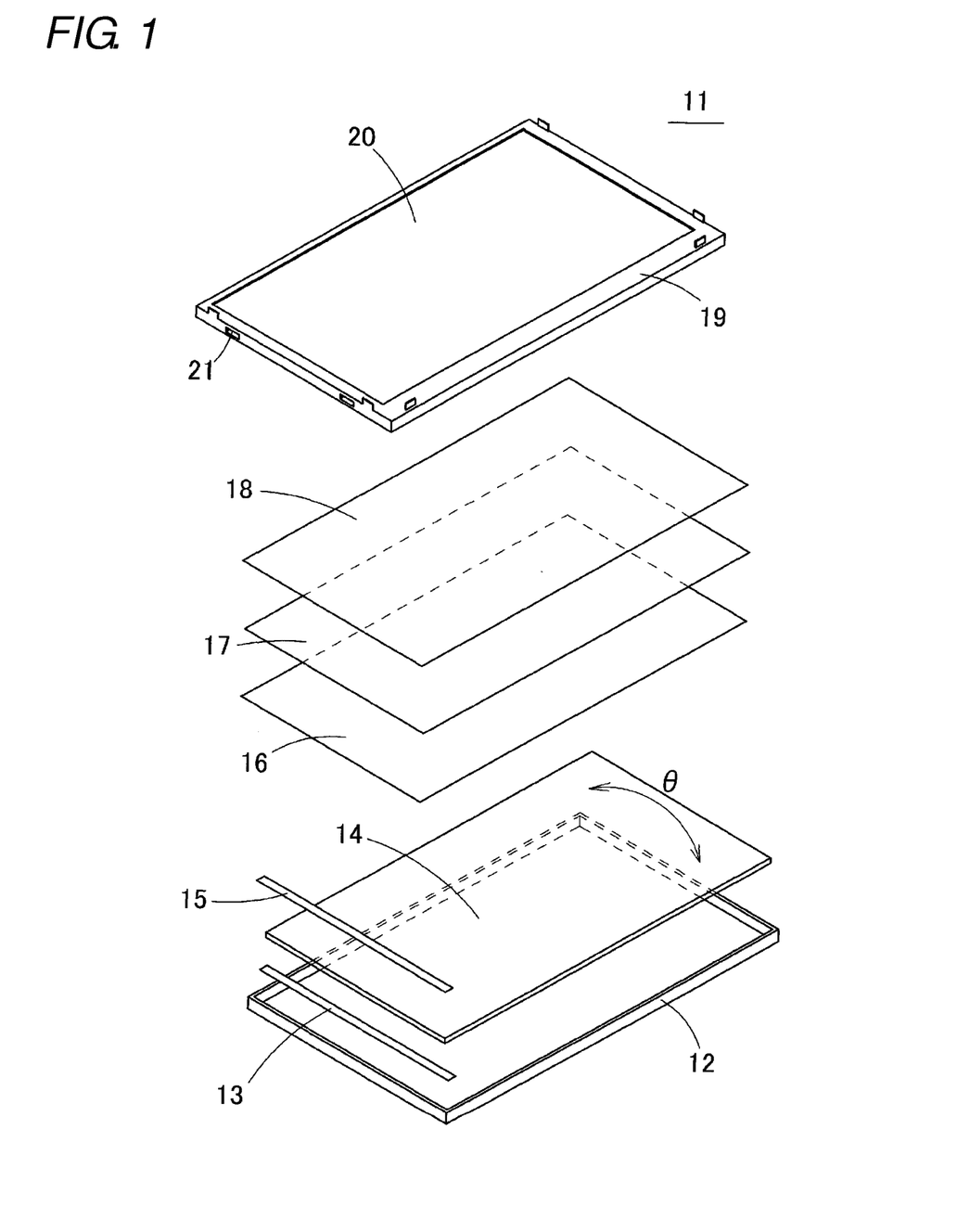
FIG. 1 is an exploded perspective view illustrating a conventional surface light source device.

FIG. 1 is an exploded perspective view illustrating a conventional surface light source device (a backlight). A light guide plate 14 and a light source (not illustrated) are accommodated in a frame 12, a diffusion sheet 16 and prism sheets 17 and 18 are stacked on the light guide plate 14, and a cover 19 is placed thereon to integrally form a surface light source device 11. A lower surface of the light guide plate 14 is adhered to a bottom surface of the frame 12 by a double-sided adhesion tape 13, and the diffusion sheet 16 and the prism sheets 17 and 18 are adhered to an upper surface of the light guide plate 14 by a double-sided adhesion tape 15. The cover 19 is attached to the frame 12 such that an inwardly-projected claw 21 of the cover 19 is press-fitted or latched to the frame 12. A window 20 is opened in the cover 19 in order to expose an emission surface of the light guide plate 14.

As described above, in the surface light source device 11, the light guide plate 14 is fixed to the frame 12 by the double-sided adhesion tape 13, and the diffusion sheet 16 or the like is fixed to the light guide plate 14 by the double-sided adhesion tape 15. Therefore, a rattle sound (hereinafter, referred to as a rattle noise) caused by a slip of the surface light source device 11 is prevented, and a positional shift of each member is prevented.

However, in the structure in which the light guide plate and the like are fixed by the double-sided adhesion tape, the double-sided adhesion tape is expensive, and an effort of fixing the light guide plate and the diffusion sheet using the double-sided adhesion tape is also required, which results in a problem in that assembly cost of the surface light source device increases. When the light guide plate and the like are fixed only by the double-sided adhesion tape, the double-sided adhesion tape may be peeled off due to vibration or heat. When the double-sided adhesion tape is partially peeled off, the slip of the light guide plate is generated in a length direction (δ direction in FIG. 1) of the double-sided adhesion tape, and the chain-reaction peel-off is generated in the double-sided adhesion tape by the slip, which results in the generation of the rattle noise. When the slip of the light guide plate or the like is generated and the double-sided adhesion tape is peeled off, for example, a gap is generated between an edge of the light guide plate and an edge of a window of a bezel cover, and a bright line is generated due to a screen tear. Similarly, a collective property may be degraded due to the shift of the prism sheet. Since the double-sided adhesion tape is sandwiched between the diffusion sheet and the light guide plate, a thickness of the light guide plate disadvantageously increases.

For example, in a surface light source device disclosed in Japanese Unexamined Patent Publication No. 2003-207767, outer peripheries of a plurality of rectangular optical sheets are bonded by a bonding agent, and the outer periphery of a gap between the sheets is sealed. In this case, the plurality of sheets are integrally bonded to each other in one side on an opposite side of a light source by a non-plastic bonding agent layer in which a shear deformation is not generated. The plurality of sheets are integrally bonded to each other in other three sides by a plastic bonding agent layer in which the shear deformation can be generated by a stress caused by a difference in thermal expansion. Similarly, a plurality of integrated optical sheets and the light guide plate are integrally bonded to each other in one side on the opposite side of the light source by the non-plastic bonding agent layer in which the shear deformation is not generated, and the optical sheets and the light guide plate are integrally bonded to each other in other three sides by the plastic bonding agent layer in which the shear deformation can be generated by the stress caused by the difference in thermal expansion.

However, in the surface light source device having the above structure, the outer peripheries of the plurality of optical sheets are bonded, and the outer peripheries of the optical sheet and the light guide plate are also bonded. Therefore, the cost of the bonding agent increases, and the thickness of the surface light source device increases. Since a bonding margin is required in the outer peripheries of the optical sheet and the light guide plate, a region that can be used as the emission surface is narrowed in the light guide plate to degrade use efficiency of the light guide plate. In the case where a foreign substance invades between the optical sheets or between the optical sheet and the light guide plate in a surface light source device assembling process, there is a problem in that the foreign substance cannot be removed.

SUMMARY

One or more embodiments of the present invention has been made in view of the above technical problems, and an object thereof is to provide a surface light source device in which an optical sheet and a light guide plate can be firmly fixed to a frame at low cost.

In accordance with one or more embodiments of the present invention, a surface light source device includes: a light source; a frame that includes an accommodation part, at least a part of the accommodation part being surrounded by a sidewall; a light guide plate that is accommodated in the accommodation part; and at least one optical sheet stacked on the light guide plate, wherein a part of the light guide plate and a part of the optical sheet are arranged to provide a gap between a part of an outer surface of the light guide plate and an inner surface of the sidewall, the gap being filled with an adhesive resin for fixing the part of the light guide plate and the part of the optical sheet to the frame. The part of the light guide plate or the optical sheet is not limited to one point, but may be a plurality of points.

In one or more embodiments of the present invention, the part of the light guide plate and the part of the optical sheet are fixed to the frame by the adhesive resin with which the gap between the light guide plate and the frame is filled. Therefore, the inexpensive adhesive resin can be used compared with the double-sided adhesion tape, usage of the adhesive resin can be decreased, and the light guide plate and the optical sheet can be firmly fixed to the frame at low cost. The light guide plate and the optical sheet can be firmly fixed to the frame, and the peel-off of the light guide plate or the optical sheet is hardly generated. Therefore, the light guide plate and the optical sheet are hardly moved or shifted, the generation of the rattle noise can be prevented, and the generation of the bright line caused by the screen tear can also be prevented. Additionally, the thickness of the surface light source device does not increase, and the emission region of the light guide plate is hardly narrowed.

In the surface light source device according to one or more embodiments of the present invention, the outer surface of the light guide plate is partially recessed to form a fixing surface.

The fixing surface and the frame is being arranged to provide a gap between the fixing surface and the frame for filing with the adhesive resin at a position where the fixing surface is formed. Accordingly, the light guide plate is recessed to form the adhesion surface, an amount of adhesive resin with which the gap between the light guide plate and the frame is filled can be increased, to thereby enhance the fixing strength between the light guide plate and the frame. For example, the fixing surface may be constructed by a surface bent in a zigzag manner. The fixing surface may be formed by removing or cutting off a corner portion of the light guide plate. The fixing surface and the frame is being arranged to provide a gap between the fixing surface and the frame for filing with the adhesive resin at a position where the fixing surface is formed.

The surface light source device according to one or more embodiments of the present invention includes a plurality of optical sheets, wherein each of at least second and subsequent optical sheets among the plurality of optical sheets have notches at an identical position, and the notch becomes larger as the optical sheet is located lower. For example, each of at least a second and subsequent optical sheets among the plurality of optical sheets has a notch at an identical position wherein the notch of a lower one of the at least second and subsequent optical sheets is configured to be larger than the notch of a upper one of the at least second and subsequent optical sheets. Accordingly, the contact between the upper optical sheet and the adhesive resin is not blocked by the lower optical sheet, and the upper optical sheet is reliably fixed using the adhesive resin through the notch of the lower optical sheet.

In the surface light source device according to one or more embodiments of the present invention, a cover that covers the light guide plate and the optical sheet is attached to the frame, and an injection hole formed in the cover, the injection hole being for allowing injection of the adhesive resin into the gap between the light guide plate and the sidewall. Accordingly, the cover is also fixed to the frame using the adhesive resin by injecting the adhesive resin to the gap between the light guide plate and the sidewall through the injection hole of the cover.

In the surface light source device according to one or more embodiments of the present invention, a cover that covers the light guide plate and the optical sheet is attached to the frame, and injection holes formed at a corresponding position of the cover and the frame, the injection holes being for allowing injection of the adhesive resin into the gap between the light guide plate and the sidewall. The injection holes may be formed at an identical position of the cover and the frame. Accordingly, the cover is also fixed to the frame using the adhesive resin by injecting the adhesive resin to the gap between the light guide plate and the sidewall through the injection holes of the cover and the frame.

One or more embodiments of the present invention has the feature in which the above constituents are appropriately combined, and many variations can be made in the present invention by the combinations of the constituents.

DETAILED DESCRIPTION

Hereinafter, preferred embodiments of the present invention will be described in detail with reference to the accompanying drawings. However, the present invention is not limited to the following embodiments, and various design changes can be made without departing from the scope of the present invention.

(First Embodiment)

Figure 2:
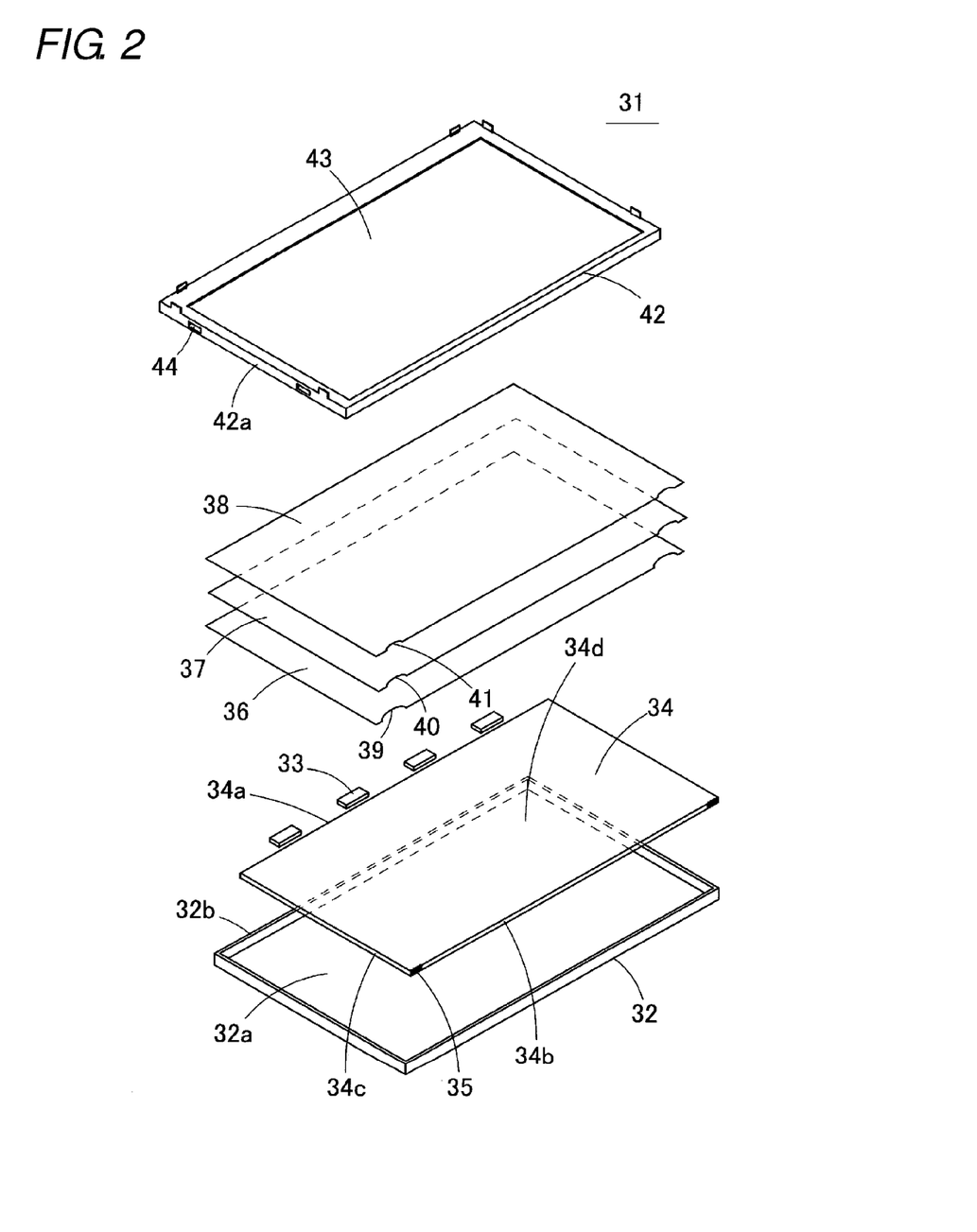
FIG. 2 is an exploded perspective view illustrating a surface light source device according to a first embodiment of the present invention.

FIG. 2 is an exploded perspective view illustrating a surface light source device 31 according to a first embodiment of the present invention. The surface light source device 31 is used as a backlight of a liquid crystal display that is incorporated in in-vehicle instruments, such as a car navigation system, tablet computers, and mobile electronic terminals.

As illustrated in FIG. 2, the surface light source device 31 includes a frame 32, a light source 33, a light guide plate 34, a plurality of optical sheets (36 to 38), and a bezel cover 42 (cover).

The frame 32 is formed by press working of an aluminum plate, and includes an accommodation part 32a that is surrounded by a sidewall 32b.

The light source 33 is an LED light source in which an LED chip is incorporated. The light source 33 is mounted on a flexible printed board (not illustrated). When being turned on, the light source 33 emits white light from an output window of a front surface.

The light guide plate 34 is molded using high-refractive-index transparent resins, such as polycarbonate (PC) and polymethylmethacrylate (PMMA). The light guide plate 34 includes a light incident surface 34a that takes in the light and a light exit surface 34d that outputs the light to perform surface emission. The light source 33 is disposed opposite the light incident surface 34a of the light guide plate 34. Many micro light exit patterns (not illustrated) are formed on an opposite surface (a lower surface) of the light exit surface 34d in order to reflect the light in the light guide plate 34 to output the light from the light exit surface 34d. In FIG. 2, the light source 33 is disposed on a long side of the light guide plate 34. Alternatively, a short side of the light guide plate 34 may be used as the light incident surface 34a, and the light source 33 may be disposed on the short side of the light guide plate 34.

Figure 3:
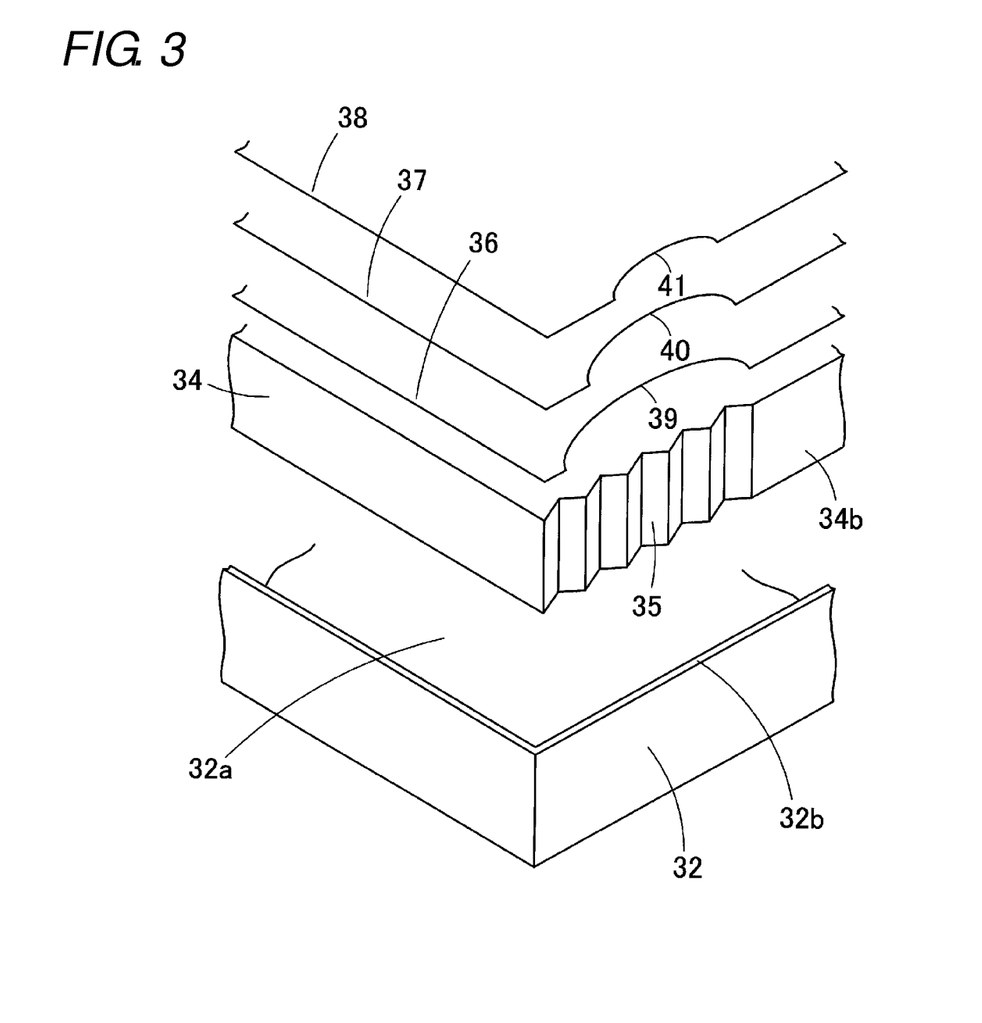
FIG. 3 is an exploded perspective view illustrating a corner portion of the surface light source device in FIG. 2.

A fixing surface 35 is provided at an adhesive point in an outer surface of the light guide plate 34. As illustrated in FIG. 3, the fixing surface 35 is formed such that the outer surface of the light guide plate 34 is bent and recessed in a zigzag manner. In the first embodiment, the fixing surfaces 35 are provided at both ends of an opposite surface 34b of the light incident surface 34a in a corner portion of the light guide plate 34. The fixing surface 35 may be a part of or a surface of the light guide plate 34 provided at any position of the light guide plate 34 so as not to affect the optical property of the surface light source device. Further, the fixing surface 35 may be configured to allow a gap (as illustrated in FIG. 4B) to be generated between the fixing surface 35 and the frame 32 so as to receive adhesive resin for fixing the light guide plate 34 to the frame 32.

The plurality of optical sheets include a diffusion sheet 36 and two prism sheets 37 and 38. The light that is obliquely output from the light exit surface 34d of the light guide plate 34 is diffused by the diffusion sheet 36 to widen a directional pattern, and transmitted through the prism sheets 37 and 38 to enhance a front luminance. In the diffusion sheet 36 and the prism sheets 37 and 38, notches 39, 40, and 41 are provided at a point, which is located immediately above the fixing surface 35 when the sheets 36 to 38 are stacked on the light guide plate 34. The notches 39, 40, and 41 may be formed into any shape. The notches 39 to 41 become larger as the notch is located lower. Accordingly, an edge of the notch of the upper sheet is exposed in the notch of the lower sheet when the stacked diffusion sheet 36 and prism sheets 37 and 38 are viewed from below.

The frame-shaped bezel cover 42 is formed by the press working of the aluminum plate, and a window 43 is opened inside the bezel cover 42 in order to expose the emission surface of the light guide plate 34 and the prism sheet 38. A claw 44 raised onto an inner surface side is provided in a sidewall 42a of the bezel cover 42.

In the case of assembly of the surface light source device 31 including the components having the above structures, as illustrated in FIG. 3, the light guide plate 34 is accommodated in the accommodation part 32a, and the diffusion sheet 36, the prism sheet 37, and the prism sheet 38 are sequentially stacked on the light guide plate 34. Because the light guide plate 34 has substantially the same dimension as the accommodation part 32a when viewed from above, although the outer surface of the light guide plate 34 and the sidewall 32b of the frame 32 are in proximity to each other, a space in which an adhesive resin can be retained between the fixing surface 35 and the sidewall 32b is formed at the point of the fixing surface 35. The notch 39 of the diffusion sheet 36 is located immediately above the fixing surface 35, the notch 40 of the prism sheet 37 is located immediately above the notch 39 to hide the notch 39, and the notch 41 of the prism sheet 38 is located immediately above the notch 40 to hide the notch 40.

Figure 4A:
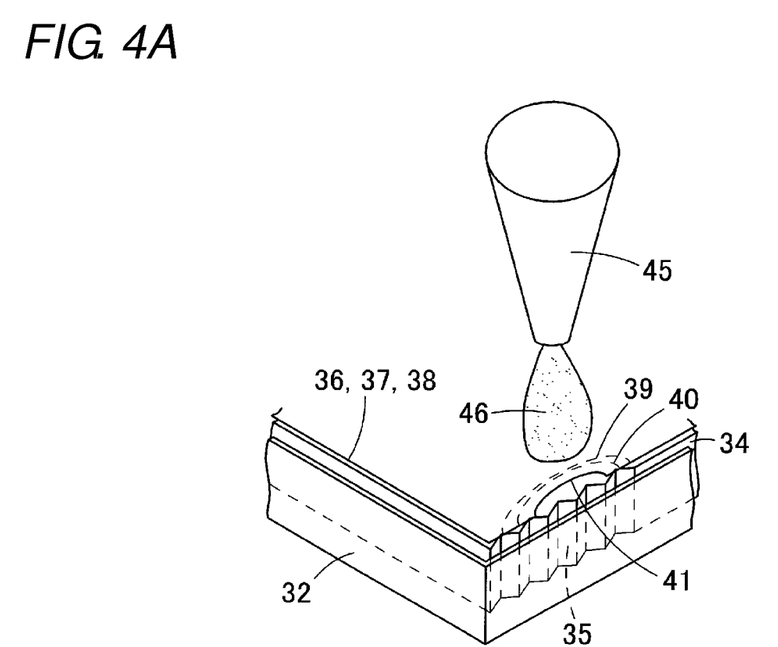
FIGS. 4A and 4B are a perspective view and a sectional view illustrating a process of assembling the surface light source device in FIG. 2.
Figure 4B:
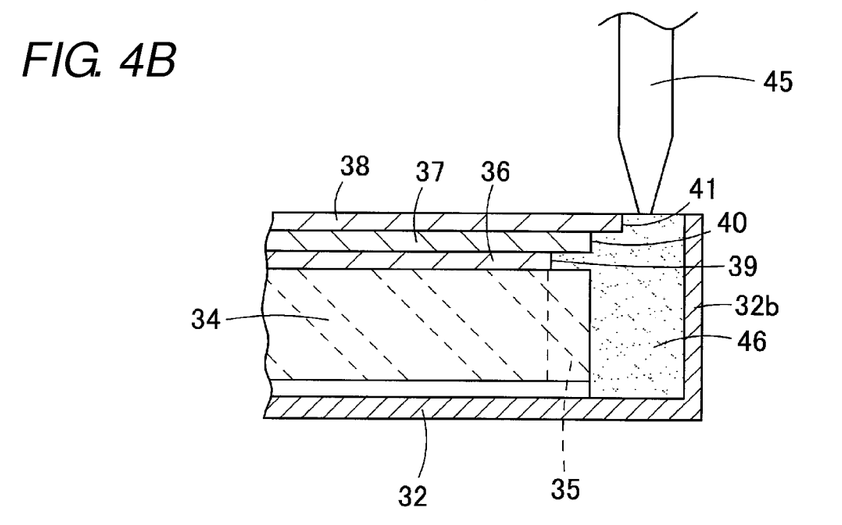

Then, as illustrated in FIG. 4A, a drop of an adhesive resin 46 is put on the positions of the notches 39 to 41 and the fixing surface 35 through a nozzle 45. As the adhesive resin 46, resins, such as a hot-melt resin (a thermoplastic resin) and an epoxy resin, which have fluidity before curing and a quick-curing property, are preferably used. Because the notches 39 to 41 are formed in the diffusion sheet 36 and the prism sheets 37 and 38 when the adhesive resin 46 is dropped onto the sheets 36 to 38, the adhesive resin 46 is absorbed between the fixing surface 35 and the sidewall 32b while the sheets 36 to 38 prevent the adhesive resin 46, and the gap between the fixing surface 35 and the sidewall 32b is filled with the adhesive resin 46 as illustrated in FIG. 4B. Thereafter, when the adhesive resin 46 is cured, a recessed portion of the light guide plate 34 and the edges of the notches 39 to 41 of the sheets 36 to 38 are fixed to the frame 32 by the adhesive resin 46. Particularly, because the notch 39 is provided in the diffusion sheet 36, the edge of the notch 40 of the prism sheet 37 is exposed from the notch 39, and the edge of the notch 40 is reliably and firmly fixed to the adhesive resin 46. Similarly, because the notch 40 is provided in the prism sheet 37, the edge of the notch 41 of the prism sheet 38 is exposed from the notch 40, and the edge of the notch 41 is reliably and firmly fixed to the adhesive resin 46. Because the fixing surface 35, which extends vertically and is recessed in the zigzag manner, is provided in the outer surface of the light guide plate 34, the adhesive resin 46 flows easily into the gap between the fixing surface 35 and the sidewall 32b when the adhesive resin 46 is dropped onto the sheets 36 to 38. Moreover, as a thickness of the adhesive resin 46 increases, an adhesion area of the light guide plate 34 is enlarged, and fixing strength of the light guide plate 34 increases. A reflecting sheet may be provided on the lower surface of the light guide plate 34.

Figure 5:
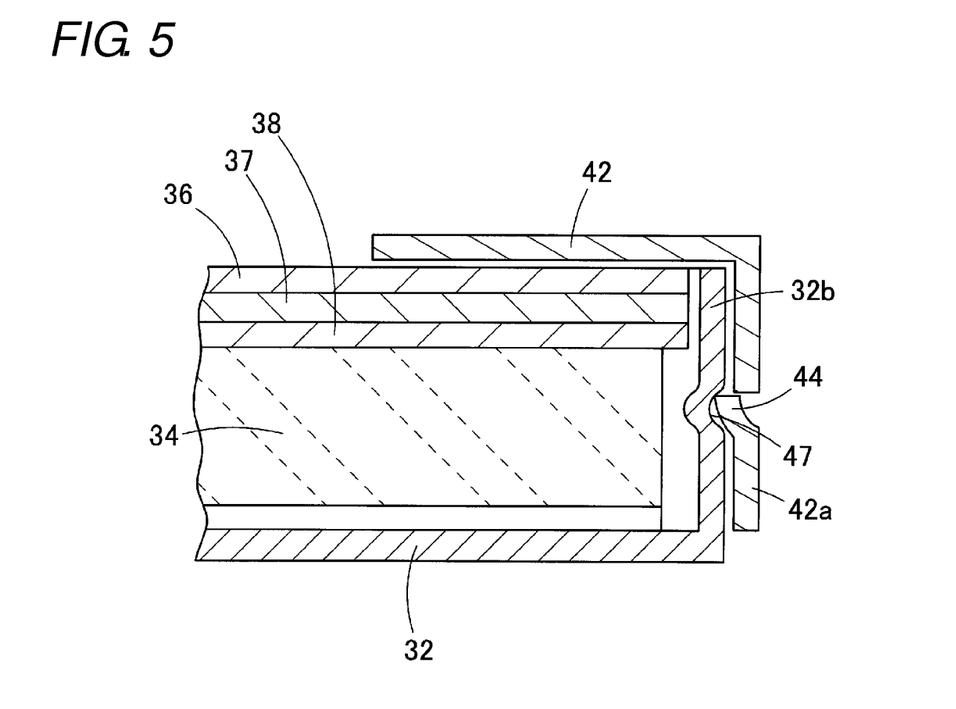
FIG. 5 is a sectional view partially illustrating the assembled surface light source device in FIG. 2.

Then, as illustrated in FIG. 5, the bezel cover 42 is placed on the frame 32 so as to cover the light guide plate 34 and the sheets 36 to 38, and the claw 44 provided in the sidewall 42a of the bezel cover 42 is engaged with a latched part 47 provided in the sidewall 32b of the frame 32. The bezel cover 42 can be detached in this structure. Therefore, the bezel cover 42 can be detached to remove a foreign substance when the foreign substance invades between the light guide plate 34 and each of the sheets 36 to 38.

In the surface light source device 31 of the first embodiment, the light guide plate 34 and the optical sheets 36 to 38 are partially fixed to the frame 32 by the adhesive resin 46 with which the gap between the light guide plate 34 and the frame 32 is filled. Therefore, compared with the conventional example in which the double-sided adhesion tape is used, the light guide plate 34 and the optical sheets 36 to 38 can be fixed by an inexpensive part, and the number of processes of assembling the light guide plate 34 and the optical sheets 36 to 38 can be reduced. Additionally, since it is only necessary to partially fix the light guide plate 34, usage of the adhesive resin is reduced, and the light guide plate 34 and the optical sheets 36 to 38 are firmly fixed to the frame 32 at low cost. As a result, the light guide plate 34 and the optical sheets 36 to 38 are firmly fixed, and peel-off of the light guide plate 34 and the optical sheet 36 to 38 is hardly generated. Therefore, the light guide plate 34 and the optical sheets 36 to 38 are hardly moved or shifted, the generation of the rattle noise can be prevented, and the generation of bright line caused by the screen tear can also be prevented. The thickness of the surface light source device 31 is not increased by the adhesive resin 46, and the emission region of the light guide plate 34 is hardly narrowed. Because the whole peripheries of the light guide plate 34 and the optical sheets 36 to 38 are not fixed to the frame 32, the foreign substance can be removed when the foreign substance is found in checking the foreign substance, and the bezel cover 42 is placed on the frame 32 to perform a final assembly after the foreign substance is checked. In the first embodiment, because only the bezel cover 42 is latched to the frame 32 by the claw 44, the bezel cover 42 can be detached to remove the foreign substance when the foreign substance invades between the sheets, and the surface light source device 31 can easily be reworked.

In the case where the whole peripheries of the light guide plate 34 and the sheets 36 to 38 are fixed to the frame 32, the light guide plate 34 and the sheets 36 to 38 are deformed or bent due to a difference in thermal expansion coefficient between the frame 32 and the light guide plate 34 or the sheets 36 to 38. Accordingly, the fixing point and the fixing area of the light guide plate 34 are preferably as small as possible as long as the required adhesive strength is obtained. For example, in four points of the corner portion of the light guide plate 34, points may be appropriately fixed by the adhesive resin 46. Alternatively, the point other than the corner portion may be fixed by the adhesive resin 46 as long as an optical property of the surface light source device 31 is not lost. A plurality of points, preferably two points are fixed by the adhesive resin 46. However, only one point may be fixed as long as the strength is obtained.

As illustrated in FIG. 2, the width of the bezel cover 42 is increased on the side of the light source 33 such that the light of the light source 33 hardly leaks. Similarly, when the width of the bezel cover 42 is increased on the side on which the fixing surface 35 and the notches 39 to 41 are provided, the leakage of the light from the notches 39 to 41 can be reduced.

(Modifications of First Embodiment)

Figure 6:
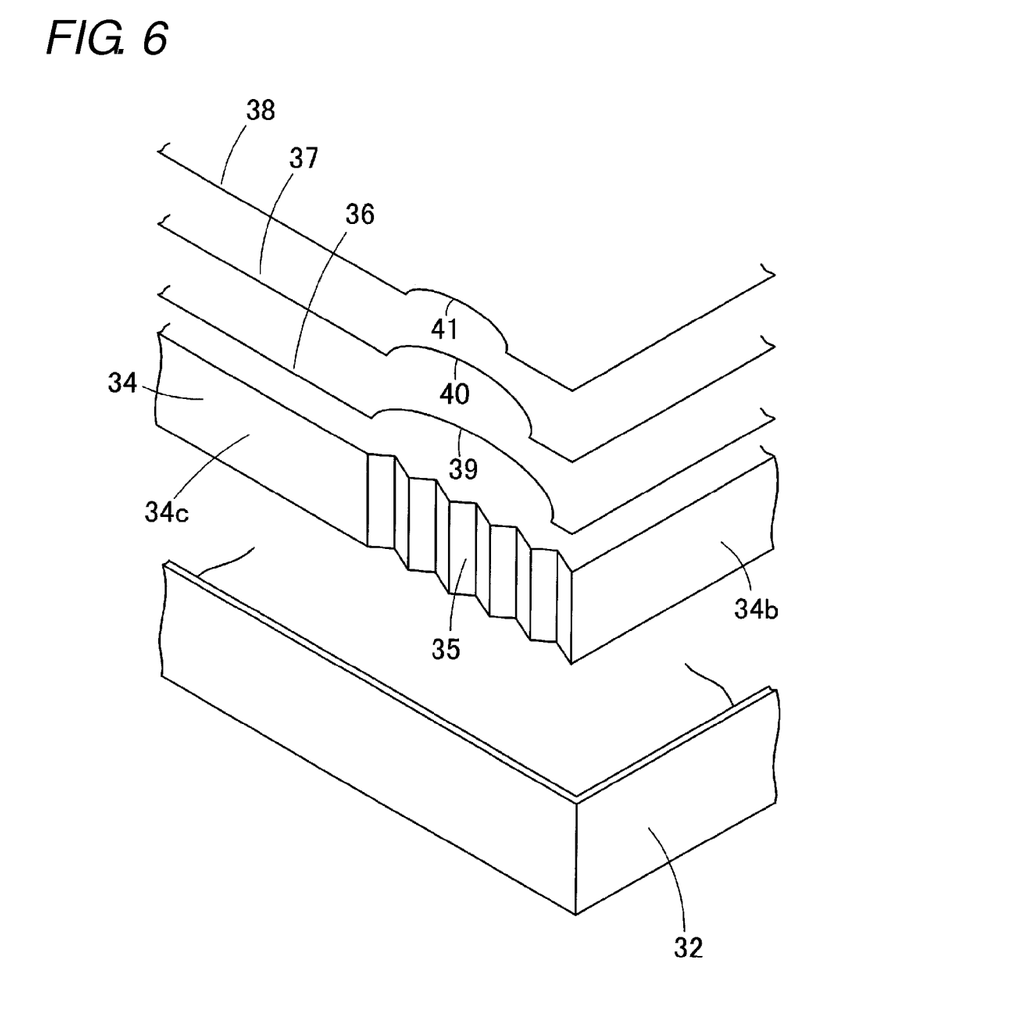
FIG. 6 is an exploded perspective view illustrating a part of a surface light source device according to a modification of the first embodiment of the present invention.

FIG. 6 illustrates a modification of the first embodiment of the present invention. In this modification, the fixing surface 35 is provided in a side surface 34c (a surface orthogonal to the light incident surface 34a in the outer surface) of the light guide plate 34 in the corner portion of the light guide plate 34. As illustrated in FIG. 3, the fixing surface 35 is formed by the surface bent in the zigzag manner.

Figure 7:
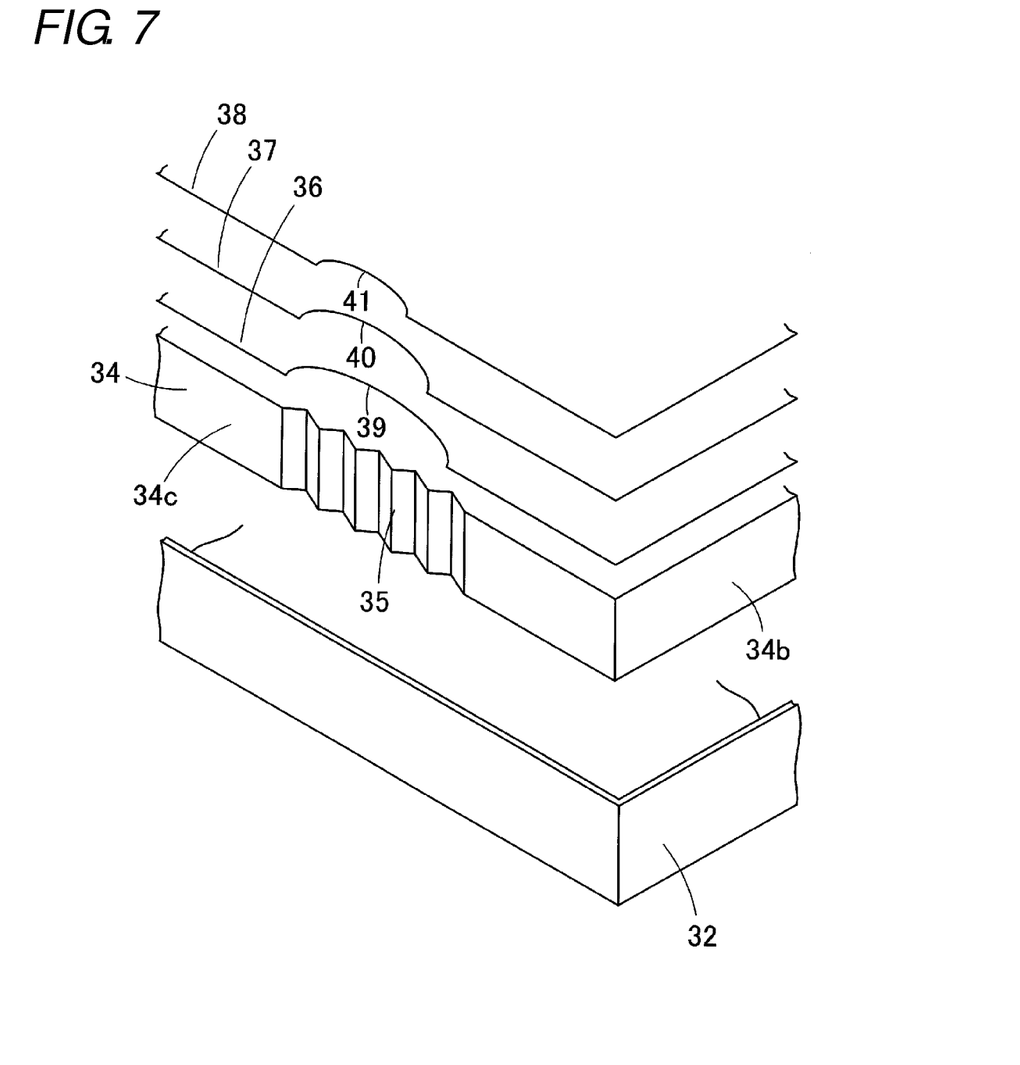
FIG. 7 is an exploded perspective view illustrating a part of a surface light source device according to another modification of the first embodiment of the present invention.

FIG. 7 illustrates another modification of the first embodiment of the present invention. In this modification, the fixing surface 35 is provided at a position distant from the corner portion in the outer surface of the light guide plate 34. Additionally, the fixing surface 35 may be provided at any position as long as the fixing surface 35 has a little influence on the optical property of the surface light source device.

(Second Embodiment)

Figure 8:
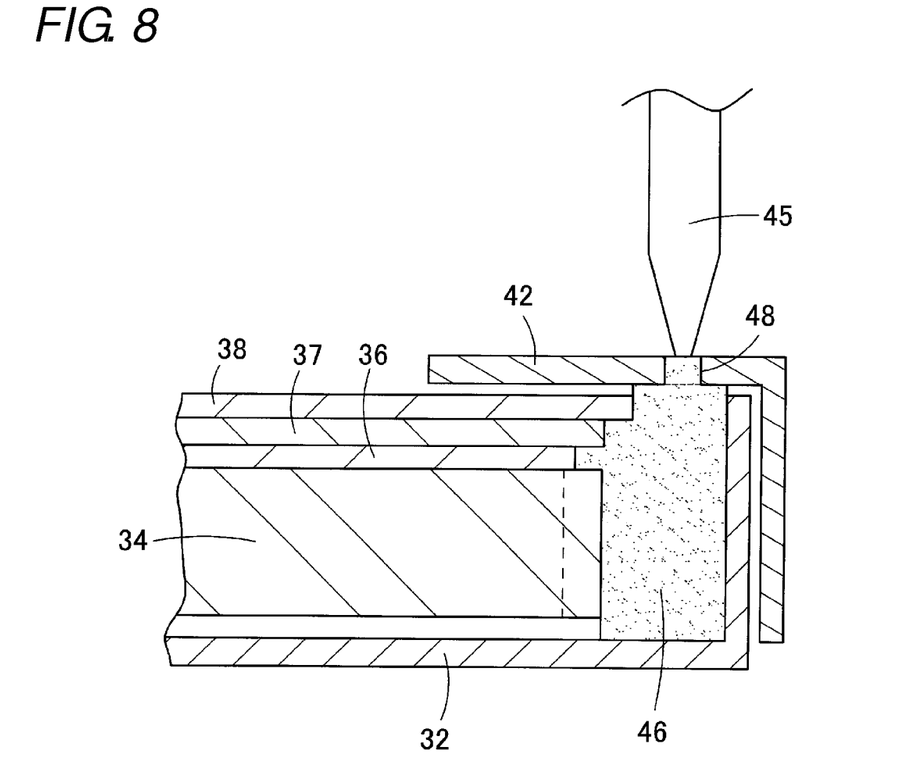
FIG. 8 is a sectional view illustrating a process of assembling a surface light source device according to a second embodiment of the present invention.

FIG. 8 is a sectional view illustrating part of a surface light source device according to a second embodiment of the present invention. In the surface light source device of the second embodiment, an injection hole 48 is made in the bezel cover 42 immediately above the gap between the fixing surface 35 and the sidewall 32b. In the second embodiment, other structures are identical to those of the first embodiment, and thus, the description thereof is omitted (the same applies to the following embodiments).

In the surface light source device of the second embodiment, the bezel cover 42 includes the injection hole 48 immediately above the gap between the fixing surface 35 and the sidewall 32b, so that the adhesive resin 46 can be injected from the injection hole 48 by the nozzle 45. The bezel cover 42 can also be fixed to the adhesive resin 46 by injecting the adhesive resin 46 from the injection hole 48. Therefore, it is not necessary to provide the claw 44 in the bezel cover 42. When the claw 44 is eliminated, a trouble that the bezel cover 42 or the frame 32 is scraped to generate aluminum dust is solved in attaching and detaching the bezel cover 42, and the inside or the surroundings of the surface light source device are not contaminated by the aluminum dust.

(Third Embodiment)

Figure 9:
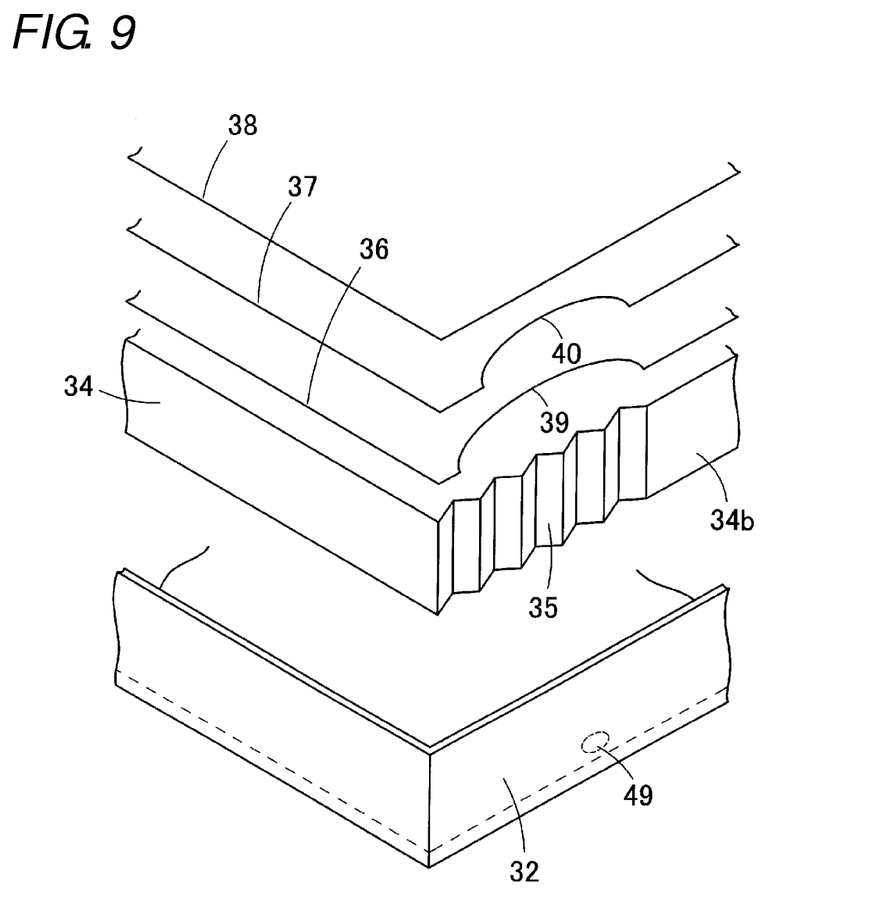
FIG. 9 is an exploded perspective view illustrating a corner portion of a surface light source device according to a third embodiment of the present invention.
Figure 10:
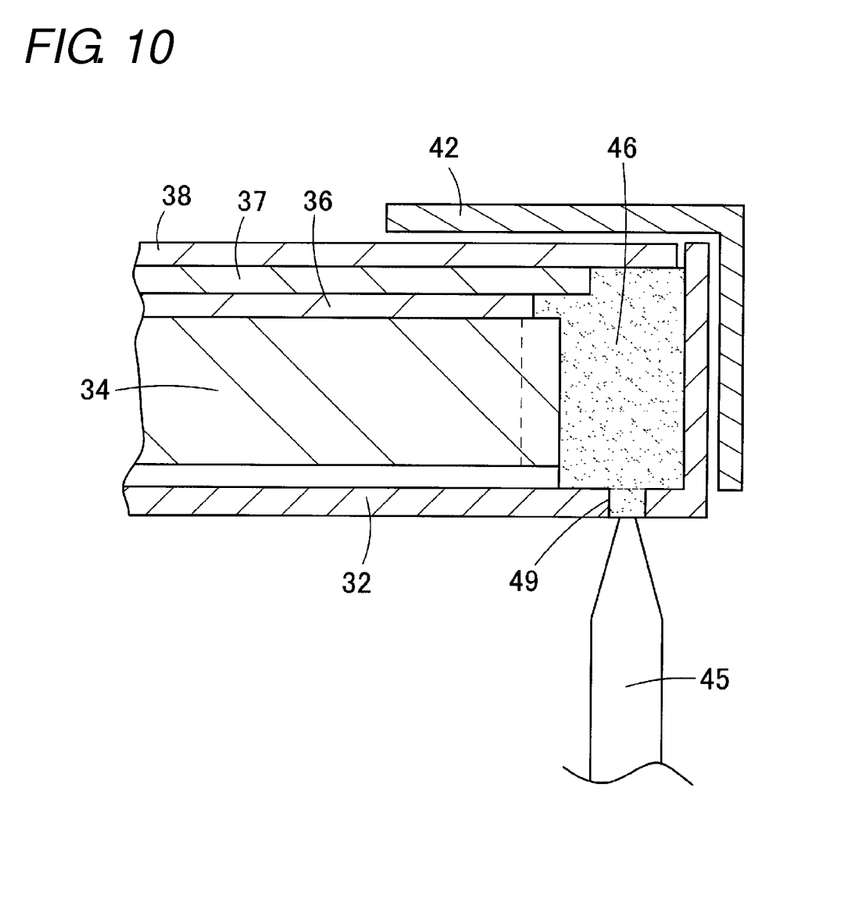
FIG. 10 is a sectional view illustrating a process of assembling the surface light source device in FIG. 9.

FIGS. 9 and 10 are an exploded perspective view and a sectional view illustrating a part of a surface light source device according to a third embodiment of the present invention. In the surface light source device of the third embodiment, an injection hole 49 is opened in a bottom surface of the frame 32 immediately below the gap between the fixing surface 35 and the sidewall 32b. The notch 41 is not provided in the prism sheet 38.

In the surface light source device of the third embodiment, the frame 32 includes the injection hole 49 immediately below the gap between the fixing surface 35 and the sidewall 32b, so that the adhesive resin 46 can be injected from the injection hole 49 through the nozzle 45. Because the adhesive resin 46 is injected from the lower surface side, the injection of the adhesive resin 46 is not prevented even if the notch 41 is not provided in the prism sheet 38. Instead, since the adhesion area of the prism sheet 38 is enlarged, the adhesive strength of the prism sheet 38 is enhanced.

(Fourth Embodiment)

Figure 11:
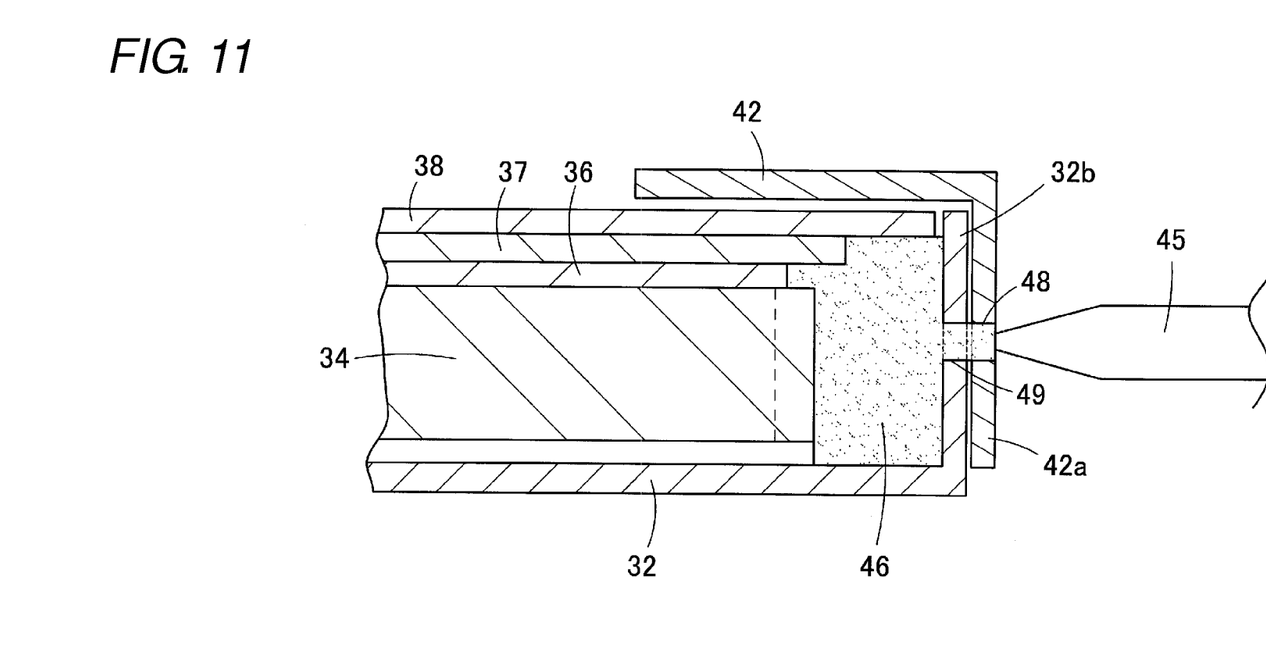
FIG. 11 is a sectional view illustrating a process of assembling a surface light source device according to a fourth embodiment of the present invention.

FIG. 11 is a sectional view illustrating a part of a surface light source device according to a fourth embodiment of the present invention. In the surface light source device of the fourth embodiment, at the position corresponding to the fixing surface 35, the injection hole 49 is opened in the sidewall 32b of the frame 32 and the injection hole 48 is opened in the sidewall 42a of the bezel cover 42.

In the surface light source device of the fourth embodiment, the adhesive resin 46 can be injected from the injection holes 48 and 49 through the nozzle 45. The bezel cover 42 can also be fixed to the frame 32 using the adhesive resin 46 by injecting the adhesive resin 46 from the injection holes 48 and 49 in this manner. Therefore, it is not necessary to provide the claw 44 in the bezel cover 42, the trouble that the bezel cover 42 or the frame 32 is scraped to generate the aluminum dust is solved in attaching and detaching the bezel cover 42, and a risk that the dust invades in the surface light source device to become the foreign substance is eliminated.

(Fifth Embodiment)

Figure 12A:
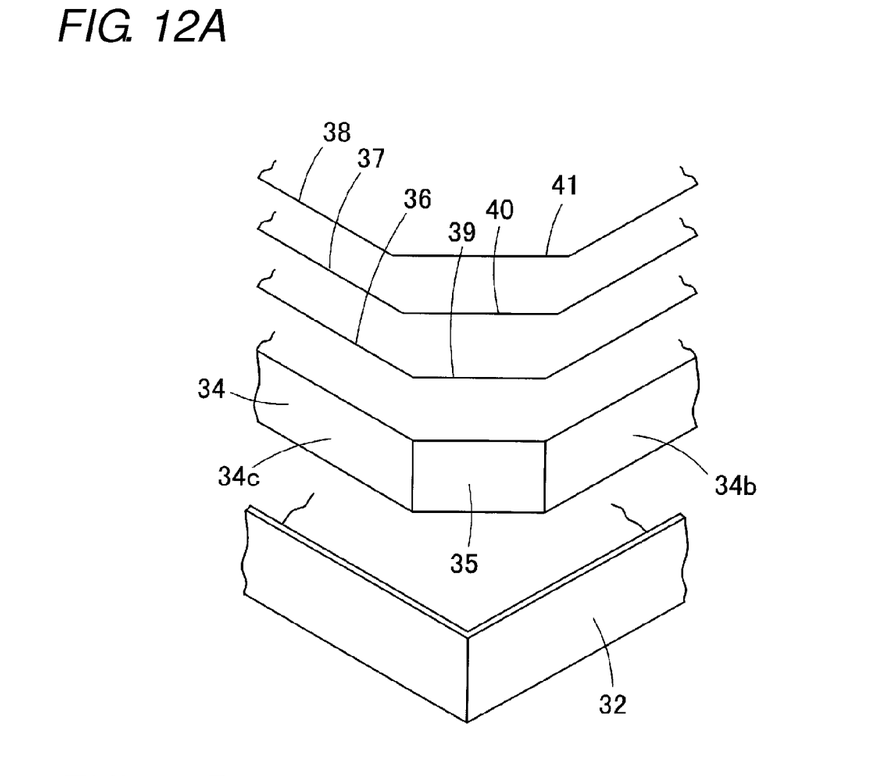
FIG. 12A is an exploded perspective view illustrating a corner portion of a surface light source device according to a fifth embodiment of the present invention.
Figure 12B:
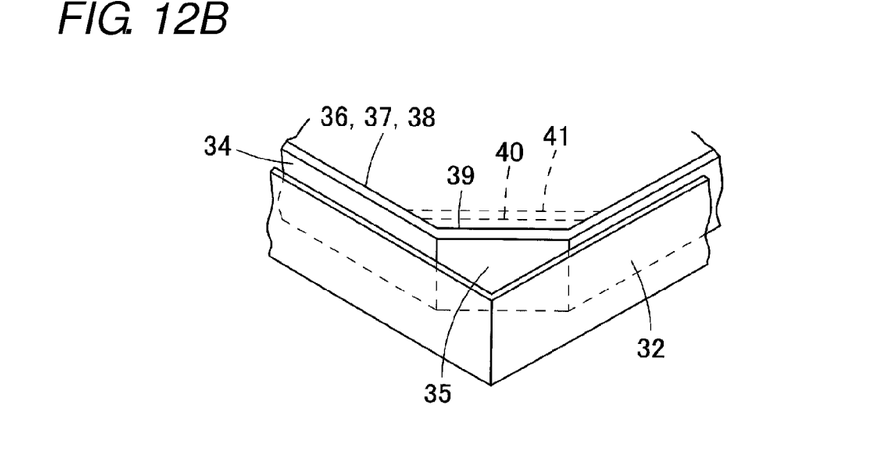
FIG. 12B is a partial perspective view illustrating a state in which a light guide plate and each sheet are accommodated in a frame.

FIG. 12A is an exploded perspective view illustrating a part of a surface light source device according to a fifth embodiment of the present invention. FIG. 12B is a perspective view illustrating a state in which the light guide plate 34 and the sheets 36 to 38 are accommodated in the frame 32. In the surface light source device of the fifth embodiment, the corner portion of the light guide plate 34 is obliquely removed to form the fixing surface 35 so that the fixing surface 35 and the frame 32 being arranged to provide a gap between the fixing surface 35 and the frame 32 for filing with the adhesive resin at a position where the fixing surface 35 is formed. Moreover, the corner portions of the diffusion sheet 36 and the prism sheets 37 and 38 are obliquely cut to form the notches 39 to 41. According to the structure of the fifth embodiment, a large amount of adhesive resin 46 can be held between the fixing surface 35 and the sidewall 32b of the frame 32, so that the fixing strength of the light guide plate 34 can further be enhanced. In the state in which the diffusion sheet 36 and the prism sheets 37 and 38 are stacked on the upper surface of the light guide plate 34, as illustrated in FIG. 12B, the corner portion recedes to the inside deeper as the sheet is located lower.

(Modification of Fifth Embodiment)

Figure 13A:
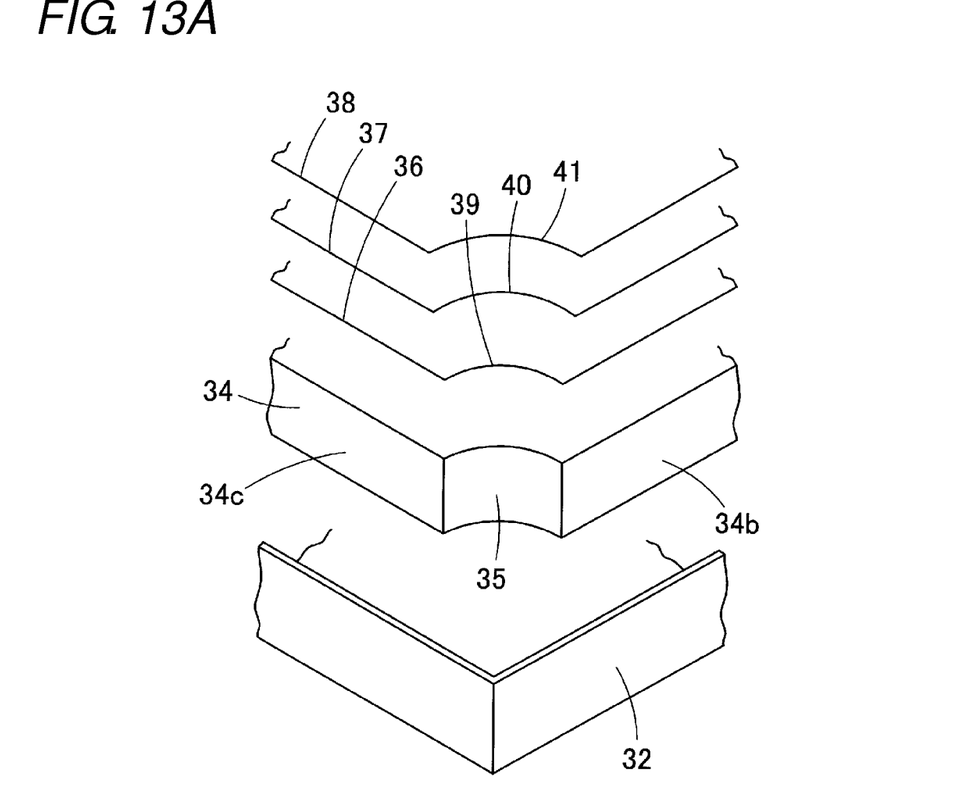
FIG. 13A is an exploded perspective view illustrating a surface light source device according to a modification of the fifth embodiment of the present invention.
Figure 13B:
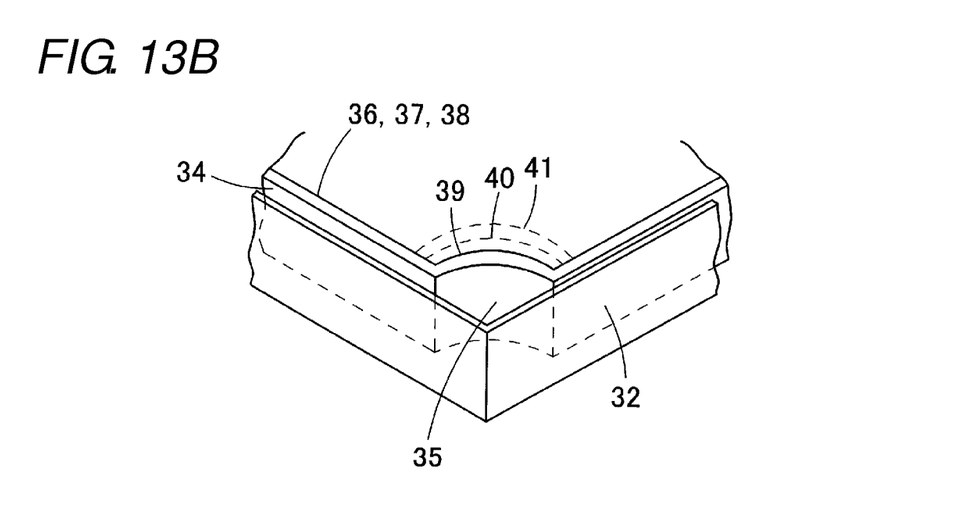
FIG. 13B is a partial perspective view illustrating a state in which the light guide plate and each sheet are accommodated in the frame.

FIG. 13A is an exploded perspective view illustrating a modification of the fifth embodiment of the present invention. FIG. 13B is a perspective view illustrating a state in which the light guide plate 34 and the sheets 36 to 38 are accommodated in the frame 32. In this modification, the fixing surface 35 provided in the corner portion of the light guide plate 34 is curved into a substantially arc shape. The notches 39 to 41 provided in the corner portions of the diffusion sheet 36 and the prism sheets 37 and 38 are also curved into the substantially arc shape. According to this modification, a large amount of adhesive resin 46 can be held between the fixing surface 35 and the sidewall 32b of the frame 32, so that the fixing strength of the light guide plate 34 and the like can be further enhanced.

The fixing surface 35 and the notches 39 to 41 may be formed into shapes other than the shapes in FIGS. 12A, 12B, 13A, and 13B according to the ease of tearing and bonding or usages While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A surface light source device comprising:
   a light source;
   a frame that includes an accommodation part, at least a part of the accommodation part being surrounded by a sidewall;
   a light guide plate accommodated in the accommodation part; and
   at least one optical sheet stacked on the light guide plate, wherein
   a part of the light guide plate and a part of the optical sheet arranged to provide a gap between a part of an outer surface of the light guide plate and an inner surface of the sidewall, the gap having an adhesive resin for fixing the part of the light guide plate and the part of the optical sheet to the frame,
   wherein the at least one optical sheet comprises a plurality of optical sheets, each of at least a second and subsequent optical sheets among the plurality of optical sheets having a notch at an identical position, the notch of a lower one of the at least second and subsequent optical sheets being configured to be larger than the notch of an upper one of the at least second and subsequent optical sheets.

2. The surface light source device according to claim 1, wherein the outer surface of the light guide plate is partially recessed to form a fixing surface, the fixing surface and the frame being arranged to provide a gap between the fixing surface and the frame for filing with the adhesive resin at a position where the fixing surface is formed.

3. The surface light source device according to claim 2, wherein the fixing surface is a surface bent in a zigzag manner.

4. The surface light source device according to claim 1, wherein a corner portion of the light guide plate is removed to form a fixing surface, the fixing surface and the frame being arranged to provide a gap between the fixing surface and the frame for filing with the adhesive resin at a position where the fixing surface is formed.

5. The surface light source device according to claim 1, further comprising:
   a cover that covers the light guide plate and the optical sheet, the cover being attached to the frame; and
   an injection hole formed at the cover, the injection hole being for allowing the adhesive resin to be injected to the gap between the light guide plate and the sidewall through the injection hole.

6. The surface light source device according to claim 1, further comprising:
   a cover that covers the light guide plate and the optical sheet, the cover being attached to the frame; and
   and injection holes formed at a corresponding position of the cover and the frame, the injection holes being for allowing the adhesive resin to be injected to the gap between the light guide plate and the sidewall through the injection holes.

* * * * *